Dec. 24, 1929.  N. J. OFSTAD  1,740,868
FRUIT WASHING MACHINE
Filed Aug. 31, 1925  3 Sheets-Sheet 1

INVENTOR.
NICHOLAS J. OFSTAD
Munn & Co.
ATTORNEY

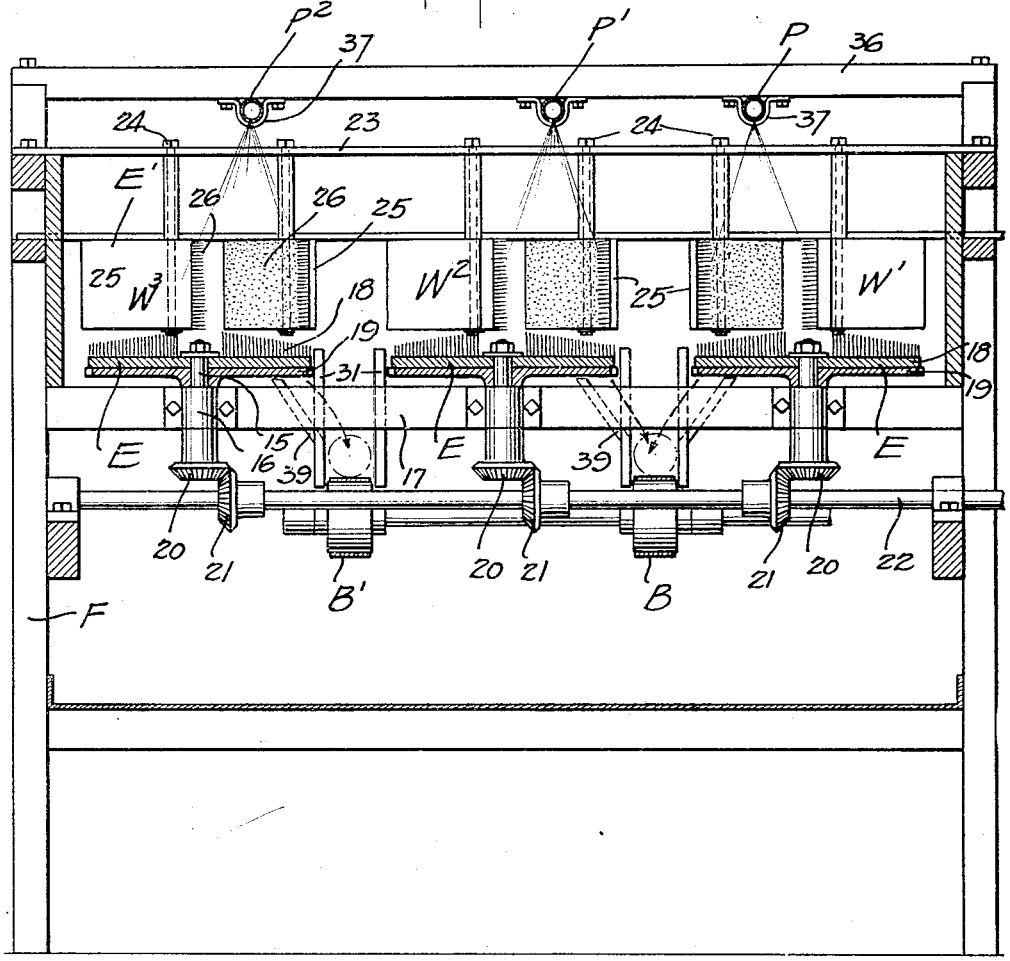
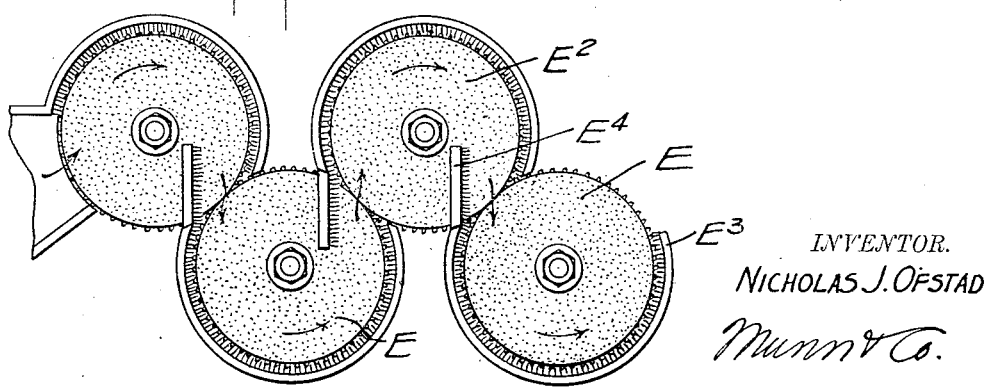

Dec. 24, 1929.  N. J. OFSTAD  1,740,868
FRUIT WASHING MACHINE
Filed Aug. 31, 1925    3 Sheets-Sheet 3
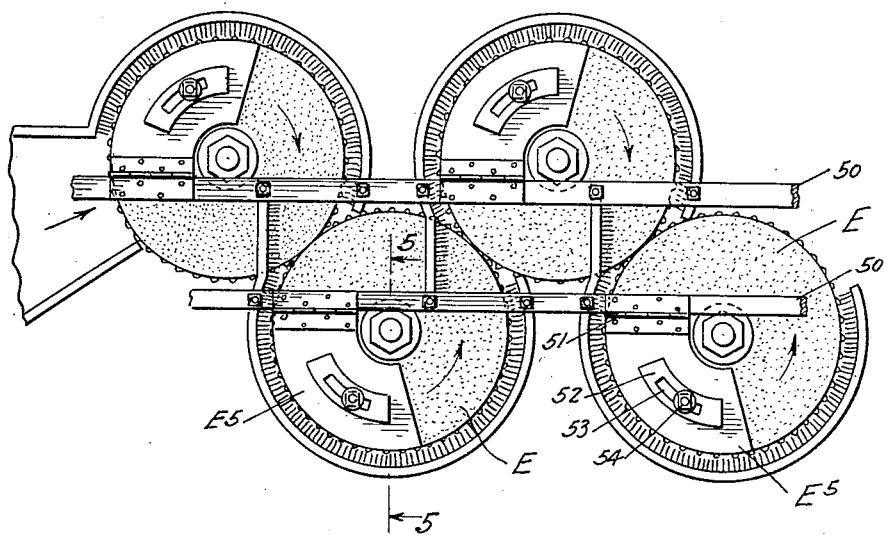
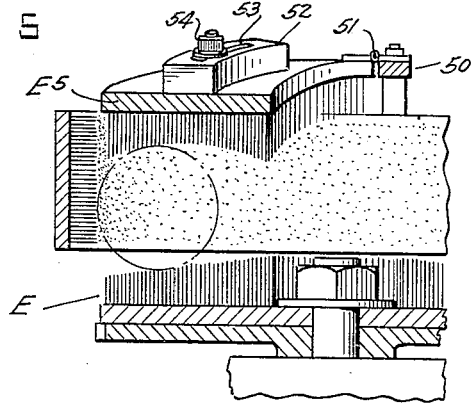
INVENTOR.
NICHOLAS J. OFSTAD
BY Munn & Co.
ATTORNEYS.

Patented Dec. 24, 1929

1,740,868

UNITED STATES PATENT OFFICE

NICHOLAS J. OFSTAD, OF REDLANDS, CALIFORNIA, ASSIGNOR TO WILLIAM L. CONNOR, OF LOS ANGELES, CALIFORNIA

FRUIT-WASHING MACHINE

Application filed August 31, 1925. Serial No. 53,666.

My invention relates to fruit washing machines of the character embodied in my copending applications Serial No. 53,668, filed August 31st, 1925 and Serial No. 73,372, filed December 5th, 1925.

A purpose of my present invention is the provision of a fruit washing machine embodying a plurality of washing or scrubbing units compactly associated to produce a machine occupying a minimum amount of floor space, and automatic and thorough in the cleaning of fruit without injury thereto and in relatively large quantities.

It is also a purpose of my invention to provide a fruit washing machine in which each of the washing units embodies a linear arrangement of constantly moving brush elements co-operating with stationary brush elements, the latter being arranged to define tortuous passages or channels through which the fruit during the washing operation is caused to travel, thereby greatly increasing the period of washing in a machine of a given length and, hence, producing a machine of increased efficiency and capacity.

A further object of my invention is the provision of a fruit washing machine in which means is provided in each of the washing units for discharging fruit from the units at any of several points along its length, whereby the duration of the washing period to which the fruit is subjected in any one washing unit can be varied as desired.

I will describe only three forms of fruit washing machine embodying my invention and will then point out the novel features thereof in claims.

In the accompanying drawings,

Figure 2 is a vertical transverse sectional view taken on the line 2—2 of Figure 1;

Figure 3 is an enlarged fragmentary plan view of another form of fruit washing machine embodying my invention;

Figure 4 is a view similar to Figure 3, showing a third form of fruit washing machine embodying my invention;

Figure 5 is a vertical sectional view taken on the line 5—5 of Figure 4.

Figure 1:
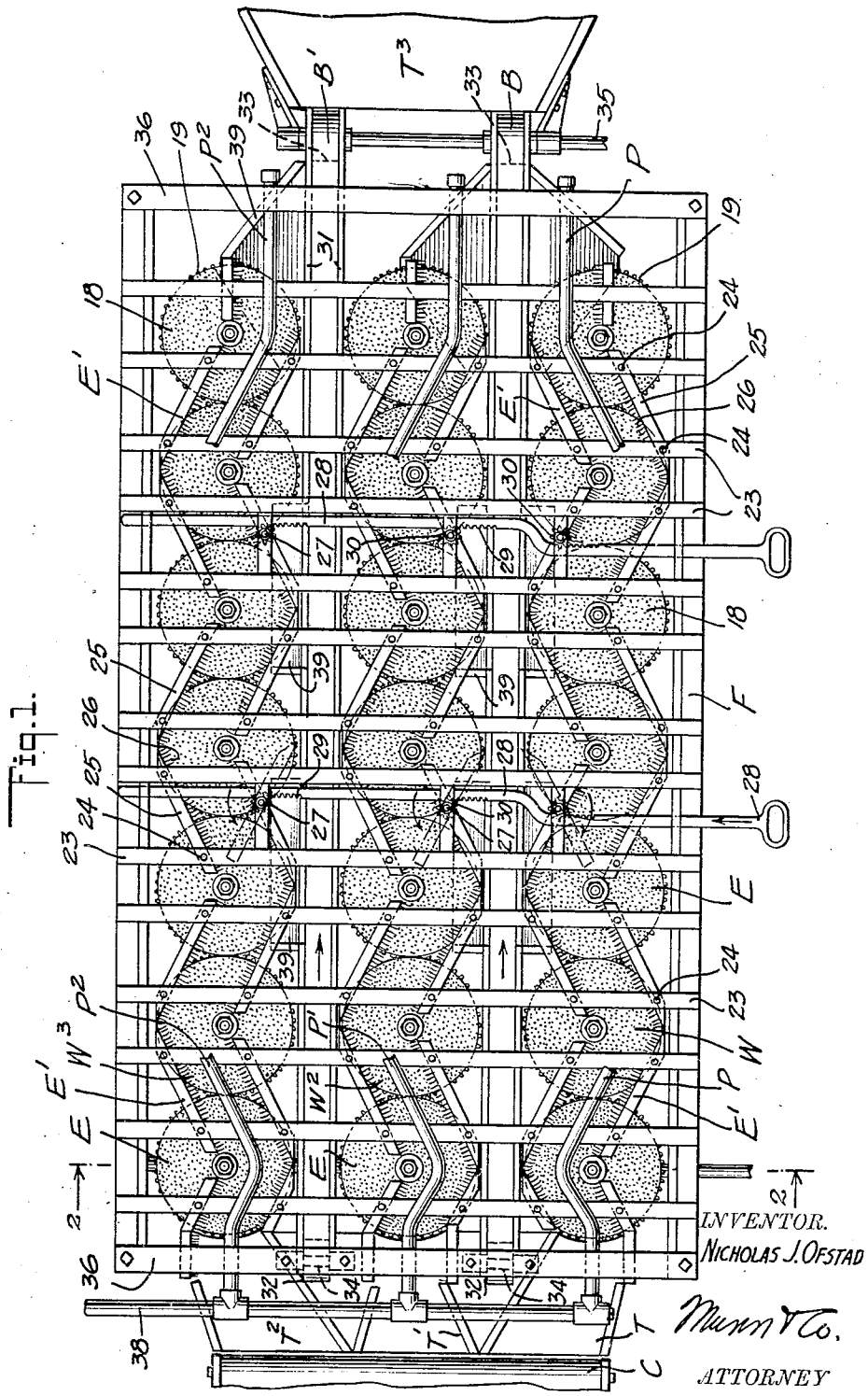
Figure 1 is a view showing in top plan one form of fruit washing machine embodying my invention.

Referring specifically to the drawings, in which similar reference characters refer to similar parts in each of the several views, my invention, in the embodiment shown in Figures 1 and 2, comprises a skeleton frame of rectangular form which is designated generally at F. Associated with the intake end of the machine, which is the left hand end as when viewed in Figure 1, is a roller conveyer C adapted to discharge fruit into a plurality of inclined troughs T, T' and $T^2$, and from these troughs the fruit is delivered to washing units W', $W^2$ and $W^3$, one for each of the troughs. At the fruit discharge end of the machine, which is the right hand end as when viewed in Figure 1, a trough $T^3$ is arranged to receive the fruit as discharged and to deliver the same to a suitable receptacle (not shown).

The three washing units are in the main identical in construction, so that a description of one will suffice for all. The washing unit W is made up of a set or series of movable brush elements E extending longitudinally of the frame and each element comprising a vertically disposed stub shaft 15 journaled in the bearing 16 secured to a cross bar 17 extending transversely of the frame F. Secured to the upper end of the stub shaft is a brush 18 of disk form and fixed to the shaft below the brush is a gear 19, the teeth of which project beyond the periphery of the brush to have intermeshing engagement with the gear of an adjacent brush element. As shown in Figure 2, that brush element adjacent to the intake trough T and which I term the master brush element, is adapted to drive through its gear 19 all of the other brush elements of the series, and to this end the stub shaft 15 of such element is provided with a miter gear 20 which constantly meshes with a similar gear 21 fixed to a driving shaft 22 journaled in the frame F with one end extending from the side of the frame to permit the application of power thereto, as will be understood.

In conjunction with the movable brush element E, each washing unit is provided with a series of stationary brush elements E' supported in superposed relation with respect to the rotary brushes 18 from bars 23 extending transversely at intervals along the length of the frame F. Bolts 24 extend through the bars 23 and through the backings 25 of brushes 26, such brushes being vertically disposed and arranged with respect to the brushes 18, so as to have portions thereof extending radially from certain of the rotary brushes and other portions disposed tangentially with respect to the adjacent rotary brushes, whereby a zigzag or staggered arrangement of the brushes 26 is provided to form a tortuous passage along the entire length of the series of rotary brushes through which the fruit is caused to travel.

Each stationary brush element E' embodies a brush 26 and its mounting, and while the majority of the brushes are flexibly secured to the bars 23, certain of the elements of any one series are pivotally mounted at the points indicated at 27 to permit the same to be moved to a fruit discharging position upon the actuation of operating rods 28 provided with racks 29 engaging pinions 30 fixed to the pivots 27 of the brushes.

Fruit upon traversing the brush elements of any one unit is normally discharged from the endmost rotary brush 18 into an inclined trough 31 at the discharge end of the machine, and from such trough onto the upper stretch of an endless belt B or B'. In the present instance I have provided two endless belts interposed between the washing units with the belt B designed to receive the fruit as discharged from the washing units W' and W², and the belt B' to receive the fruit as discharged from the washing unit W³. In order that the belts may function in this manner, the troughs for the washing units W' and W² are inclined in opposed directions and toward the belt B, while the trough 31 for the washing unit W³ is inclined in the direction of the belt B'. These belts are continuously driven so that the upper stretches thereof move toward the discharge end of the machine, as indicated by the arrows in Figure 1, and to drive these belts they are trained about pulleys 32 and 33 fixed to shafts 34 and 35, respectively, with the shaft 35 connected to a source of power so as to be driven thereby, as will be understood. The discharge ends of these belts B and B' are, as shown, in discharging relation to the trough T³, so that the fruit discharged onto these belts will be delivered to the trough.

Each washing unit also includes a water spraying device which, in the present instance, comprises pipes P, P' or P² of zigzag form to correspond with the curvature of the passage provided between the stationary brush elements of the corresponding washing unit. These pipes are formed with discharge openings, as shown in Figure 2, so that when water is supplied to the pipes sprays will be discharged downwardly to the brushes 18 and 26, and also onto the fruit riding on the brushes. As shown in Figure 2, the pipes are supported from cross beams 36 of the frame F by brackets 37, and a common water supply pipe 38 is connected to the several pipes P, P' and P² for supplying water thereto, as will be understood.

When washing fruit only slightly contaminated, it is only necessary to subject the same to a washing operation of short duration, and in order that each washing unit may be controlled to vary the duration of the washing period, certain of the stationary brush elements have been mounted, as previously described, to occupy a fruit discharge position in order that the fruit may be discharged from the washing unit at two points along the length of the unit. The fruit as discharged in this manner is delivered onto the upper stretches of the belts B or B' through inclined troughs 39 so that the fruit thus discharged is ultimately conveyed forward to the trough T³.

In operation, the fruit as discharged from the conveyer C is distributed to the several troughs T, T' and T², and from the latter to the respective washing units. As the fruit leaves any one trough it is delivered onto the surface of the master rotary brush 18, and with the latter rotating in a clockwise direction as when viewed in Figure 1, it will be clear that the brush operates to move the fruit into engagement with the stationary brushes 26 and along the surface of such brushes with the latter guiding the fruit onto the next rotary brush in advance. In this manner, the fruit is conveyed progressively throughout the entire series of rotary brushes and finally discharged into the corresponding trough 31. Under the scrubbing action of the brushes 18 and 26, in conjunction with the water sprayed from the pipes P, P' or P², a thorough washing of the surface of the fruit is effected, to remove any surface contaminations and to thus deliver the fruit clean and uninjured. As adjacent rotary brushes rotate in opposed directions, it will be clear that a positive feeding of the fruit from one rotary brush to another is effected, thus utilizing all of the stationary brushes in conjunction with the rotary brushes to effect a thorough cleaning of the fruit. Because of the zigzag arrangement of the stationary brushes, it will be manifest that the length of the tortuous passage for a machine of the given length is greatly increased, thus prolonging the washing period and thereby increasing the washing efficiency of the machine.

Should it be desired to shorten the washing period, where the fruit is only slightly contaminated, the several stationary brush elements can be moved from the positions shown in solid lines in Figure 1 to the dotted line positions, whereby as the fruit is discharged from the adjacent rotary brushes, it will be free to drop onto the inclined troughs 39 and from the latter onto the belt B or B', whence it is finally delivered to the trough T³. It will be understood that the shortening of the washing period is dependent upon which of the two sets of stationary brush elements is in fruit discharging position, and that through manual operation of the rods 28 either one set of elements or the other can be moved to fruit discharging position.

Referring now to Figure 3, I have here shown another arrangement of rotary and stationary brush elements embodying my invention in which the rotary brush elements designated at E² are arranged in staggered relation with respect to each other, while the stationary brush elements designated at E³ and E⁴ are arranged peripherally and radially, respectively, of the elements E², whereby a tortuous passage of increased length, over the passage shown in Figure 1, is provided, through which the fruit is forced to travel over the surfaces of the rotary brushes. The brushes E³ and E⁴ co-operate with the rotary brushes in a manner similar to that described in connection with the corresponding elements of the machine shown in Figure 1, thus effecting a thorough scrubbing of the fruit and, when used in conjunction with the spray pipe, a thorough washing thereof so that the fruit as delivered is clean and uninjured.

Referring now to Figures 4 and 5, I have shown a third form of fruit washing machine embodying my invention, which is a modification of the machine shown in Figure 3 in that each rotary brush element E has associated therewith a hinged or pivoted brush element E⁵ mounted on a bar 50 extending lengthwise of the machine so that the brush thereof is above and in coacting relation to the rotary and stationary brushes, wherefore it will be seen that the pivoted brush, aside from setting up an additional scrubbing action, functions to maintain the fruit in proper scrubbing relation to the rotary and stationary brushes and thereby effecting more thorough cleaning of the fruit.

The brush element E⁵ is pivoted as at 51 to swing about a horizontal axis, thus permitting the necessary vertical movement of the brush to receive between itself and the rotary brush fruit of various sizes, and, further, the brush element is provided with a weight 52 which functions to give added weight and hence added downward pressure of the brush on the fruit, to increase its scrubbing action as well as that of the rotary brush. To vary the pressure exerted, the weight is adjustable on the brush by slotting the same, as at 53, and extending a bolt 54 through the weight and into the brush backing, so that the bolt can function to secure the weight when tightened or release the weight when loosened, to permit in the latter instance the adjustment of the weight lengthwise of the brush and toward or away from its pivot, thereby decreasing or increasing its weight or pressure.

Although I have herein shown and described only three forms of fruit washing machine embodying my invention, it is to be understood that various changes and modifications may be made therein without departing from the spirit of the invention and the spirit and scope of the appended claims.

I claim as my invention:

1. A fruit washing machine comprising a series of movable brush elements linearly arranged, and stationary brush elements associated therewith to positively convey fruit progressively from one movable brush element to the other, said stationary brush elements being arranged to cause the fruit to describe a tortuous path over the surface formed by the movable brush elements.

2. A fruit washing machine comprising a series of movable brush elements linearly arranged, and stationary brush elements associated therewith to convey fruit progressively from one movable brush element to the other, said stationary brush elements being arranged to cause the fruit to describe a tortuous path over the surface formed by the movable brush elements, certain of said stationary brush elements being adjustable to cause a discharge of fruit from the movable brush elements at various points along the length of the series.

3. A fruit washing machine comprising a series of rotatable brush elements linearly arranged, and stationary brush elements associated therewith to convey fruit progressively from one movable brush element to the other, said stationary brush elements being arranged to cause the fruit to describe a tortuous path over the surface formed by the rotatable brush elements, and means for manually moving any one of the stationary brush elements independently of the others.

4. A fruit washing machine comprising a series of movable brush elements linearly arranged, stationary brush elements associated therewith to convey fruit progressively from one movable brush element to the other, said stationary brush elements being arranged to cause the fruit to describe a tortuous path over the surface formed by the movable brush elements, certain of said stationary brush elements being adjustable to cause a discharge of fruit from the movable brush elements at various points along the length of the series and water spraying means above the stationary and movable brush elements to direct water in the path of movement of the fruit traversing the movable brush elements.

5. A fruit washing machine comprising a plurality of washing units each including a series of movable brush elements linearly arranged and a series of stationary brush elements so arranged that when the movable brush elements are actuated fruit deposited on one endmost movable brush will be guided successively over all of the remaining brushes, certain of the stationary brush elements being adjustable to cause a discharge of fruit from the movable brush elements at predetermined points along the length of the series, and means operating to convey to a common point all fruit discharged from the end of the series of movable brush elements and the predetermined points.

6. A fruit washing machine as embodied in claim 5 wherein said conveying means comprises troughs and constantly moving belts.

7. A fruit washing machine as embodied in claim 5 wherein said conveying means comprises troughs and constantly moving belts arranged between the units.

8. A fruit washing machine comprising a plurality of washing units each including a series of movable brush elements linearly arranged, and a series of stationary brush elements so arranged that when the movable brush elements are actuated fruit deposited on one endmost movable brush will be guided successively over all of the remaining brushes, certain of the stationary brush elements being pivoted, and means common to all of the units for moving the pivoted brush elements whereby fruit will be guided from the movable brush elements of all of the units at predetermined points along the length of the units.

9. A fruit washing machine as embodied in claim 8 wherein said means comprises operating rods having racks, and pinions fixed to the pivots of the brush elements and engaged by the racks.

10. In a fruit cleaning machine, the combination of a plurality of units, each consisting of a horizontally rotatable member and a relatively stationary member extending across the movable member at an angle with its direction of movement, said units being relatively arranged so that the stationary elements of each direct the fruit from one movable surface to the next, and brush elements on the surface of one of the members of each unit.

11. In a fruit cleaning machine, the combination of a plurality of units, each consisting of a horizontally rotatable surface and a relatively stationary surface extending tangentially across the rotatable surface, the rotatable surfaces being arranged to rotate in directions opposite to each other, and brush elements on one of said surfaces of each unit.

12. In a fruit cleaning machine, the combination of a plurality of units, each consisting of a horizontally rotatable surface and a relatively stationary surface extending tangentially across the rotatable surface, the rotatable surfaces being arranged to rotate in directions opposite to each other, and brush elements on said rotating and stationary surfaces.

13. A fruit washing machine, comprising a plurality of washing units, each including a series of movable brush elements linearally arranged, and a series of stationary brush elements, one for each series of movable brush elements, the stationary brush elements of each series being in tortuous form to form a tortuous channel for the fruit, the stationary brush elements of each series being adjustable to cause a discharge of fruit from the movable brush element of the corresponding series at predetermined points along the length of the series.

14. A fruit washing machine comprising: a series of horizontally rotatable members arranged peripherally adjacent each other, with adjacent elements rotatable in opposite directions; stationary members in association with said rotatable members, arranged to direct fruit from one rotary member to the next and from one side of one rotary member to the opposite side of the adjacent rotary member, so that in its travel the fruit will follow a tortuous path; and cleaning surfaces on the rotatable members.

15. A fruit washing machine comprising: a series of horizontally rotatable members arranged peripherally adjacent each other, with adjacent elements rotatable in opposite directions; stationary members in association with said rotatable members, arranged to direct fruit from one rotary member to the next and from one side of one rotary member to the opposite side of the adjacent rotary member, so that in its travel the fruit will follow a tortuous path; and cleaning surfaces on the stationary members.

16. A fruit washing machine comprising: a series of horizontally rotatable members arranged peripherally adjacent each other, with adjacent elements rotatable in opposite directions; stationary members in association with said rotatable members, arranged to direct fruit from one rotary member to the next and from one side of one rotary member to the opposite side of the adjacent rotary member, so that in its travel the fruit will follow a tortuous path; and cleaning surfaces on said rotatable and stationary members.

17. A fruit washing machine comprising: a series of horizontally rotatable members arranged peripherally adjacent each other, with adjacent members rotatable in opposite directions; stationary members in association with the rotatable members, arranged to direct fruit progressively from one rotary member to the next and from one side of one rotary member to the opposite side of the next, in arcuate paths over each, so that in its travel the fruit will follow a tortuous path; and cleaning surfaces on the rotatable members.

18. A fruit washing machine comprising: a series of horizontally rotatable members arranged peripherally adjacent each other, with adjacent members rotatable in opposite directions; stationary members in association with the rotatable members, arranged to direct fruit progressively from one rotary members to the next and from one side of one rotary member to the opposite side of the next, in arcuate paths over each, so that in its travel the fruit will follow a tortuous path; and cleaning surfaces on the stationary members.

19. A fruit washing machine comprising: a series of horizontally rotatable members arranged peripherally adjacent each other, with adjacent members rotatable in opposite directions; stationary members in association with the rotatable members, arranged to direct fruit progressively from one rotary members to the next and from one side of one rotary member to the opposite side of the next, in arcuate paths over each, so that in its travel the fruit will follow a tortuous path; and cleaning surfaces on said rotatable and stationary members.

NICHOLAS J. OFSTAD.